United States Patent
Li et al.

(10) Patent No.: US 11,546,145 B2
(45) Date of Patent: *Jan. 3, 2023

(54) SCALABLE BYZANTINE FAULT-TOLERANT PROTOCOL WITH PARTIAL TEE SUPPORT

(71) Applicant: NEC Corporation, Tokyo (JP)

(72) Inventors: Wenting Li, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 16/952,218

(22) Filed: Nov. 19, 2020

(65) Prior Publication Data

US 2021/0075598 A1    Mar. 11, 2021

Related U.S. Application Data

(63) Continuation of application No. 15/950,185, filed on Apr. 11, 2018, now Pat. No. 10,887,090.

(Continued)

(51) Int. Cl.
*H04L 9/08* (2006.01)
*G06F 11/20* (2006.01)
(Continued)

(52) U.S. Cl.
CPC .......... *H04L 9/085* (2013.01); *G06F 11/2023* (2013.01); *H04L 9/0819* (2013.01);
(Continued)

(58) Field of Classification Search
CPC ......... H04L 9/085; H04L 9/0819; H04L 9/12; H04L 9/3234; H04L 9/321; H04L 9/3239;
(Continued)

(56) References Cited

U.S. PATENT DOCUMENTS 5,377,270 A    12/1994    Koopman et al.
6,067,621 A    5/2000    Yu et al.
(Continued)

OTHER PUBLICATIONS

Rüdiger Kapitza et al., "CheapBFT: Resource-efficient Byzantine Fault Tolerance", EuroSys'12, Apr. 10-13, 2012, pp. 1-14.

(Continued)

*Primary Examiner* — Aravind K Moorthy
(74) *Attorney, Agent, or Firm* — Leydig, Voit & Mayer, Ltd.

(57) ABSTRACT

A method is provided for preparing a plurality of distributed nodes to perform a protocol to establish a consensus on an order of received requests. The plurality of distributed nodes includes a plurality of active nodes, the plurality of active nodes including a primary node, each of the plurality of distributed nodes including a processor and computer readable media. The method includes preparing a set of random numbers, each being a share of an initial secret. Each share of the initial secret corresponds to one of the plurality of active nodes. The method further includes encrypting each respective share of the initial secret, binding the initial secret to a last counter value to provide a commitment and a signature for the last counter value, and generating shares of a second and of a plurality of subsequent additional secrets by iteratively applying a hash function to shares of each preceding secret.

15 Claims, 5 Drawing Sheets

Related U.S. Application Data

(60) Provisional application No. 62/561,726, filed on Sep. 22, 2017.

(51) Int. Cl.
*H04L 9/12* (2006.01)
*H04L 9/32* (2006.01)
*H04L 9/00* (2022.01)

(52) U.S. Cl.
CPC .............. *H04L 9/12* (2013.01); *H04L 9/3234* (2013.01); *G06F 2201/805* (2013.01); *H04L 9/321* (2013.01); *H04L 9/3239* (2013.01); *H04L 9/50* (2022.05)

(58) Field of Classification Search
CPC ... H04L 9/50; G06F 11/2023; G06F 2201/805
See application file for complete search history.

(56) References Cited

U.S. PATENT DOCUMENTS

| | | | |
|---|---|---|---|
| 6,104,810 A * | 8/2000 | DeBellis | H04L 9/0891 708/250 |
| 7,043,581 B1 * | 5/2006 | Gulick | G06F 21/71 710/240 |
| 7,242,766 B1 | 7/2007 | Lyle | |
| 7,249,108 B1 * | 7/2007 | Walmsley | H04L 9/003 713/168 |
| 8,316,237 B1 * | 11/2012 | Felsher | H04L 9/3249 380/282 |
| 9,430,655 B1 | 8/2016 | Stockton et al. | |
| 9,558,359 B1 | 1/2017 | El Defrawy et al. | |
| 9,692,757 B1 * | 6/2017 | Mikulski | H04L 9/3234 |
| 10,608,824 B1 * | 3/2020 | Praus | H04L 9/083 |
| 11,182,782 B2 * | 11/2021 | Wright | G06Q 20/405 |
| 11,223,470 B1 * | 1/2022 | Shea | H04L 9/3239 |
| 11,232,439 B2 * | 1/2022 | Westland | H04L 9/3239 |
| 11,310,060 B1 * | 4/2022 | Poelstra | H04L 9/3066 |
| 11,373,152 B2 * | 6/2022 | Wright | G06Q 20/0658 |
| 11,374,753 B2 * | 6/2022 | Lampkins | H04L 9/321 |
| 2001/0036275 A1 | 11/2001 | Murakami et al. | |
| 2002/0016913 A1 * | 2/2002 | Wheeler | H04L 9/3247 713/181 |
| 2002/0048364 A1 | 4/2002 | Gligor et al. | |
| 2003/0204732 A1 | 10/2003 | Audebert et al. | |
| 2005/0223230 A1 * | 10/2005 | Zick | H04W 12/0433 713/171 |
| 2006/0136725 A1 * | 6/2006 | Walmsley | H04L 9/3247 713/171 |
| 2006/0153372 A1 | 7/2006 | Kim et al. | |
| 2007/0005966 A1 | 1/2007 | Aissi et al. | |
| 2007/0101138 A1 * | 5/2007 | Camenisch | H04L 9/3263 713/168 |
| 2007/0160197 A1 | 7/2007 | Kagaya et al. | |
| 2007/0244951 A1 * | 10/2007 | Gressel | H04L 9/12 708/252 |
| 2008/0095360 A1 * | 4/2008 | Vuillaume | H04L 9/0863 713/180 |
| 2009/0187766 A1 | 7/2009 | Vuillaume et al. | |
| 2010/0037056 A1 | 2/2010 | Follis et al. | |
| 2011/0010552 A1 * | 1/2011 | Hoornaert | G06Q 20/341 713/168 |
| 2011/0202755 A1 | 8/2011 | Orsini et al. | |
| 2012/0255030 A1 | 10/2012 | Matsuo | |
| 2012/0297198 A1 | 11/2012 | Danezis et al. | |
| 2014/0189359 A1 * | 7/2014 | Marien | H04L 9/3228 713/172 |
| 2014/0245020 A1 * | 8/2014 | Buldas | H04L 9/3265 713/177 |
| 2014/0298027 A1 * | 10/2014 | Roberts | G06Q 20/20 713/171 |
| 2015/0023498 A1 | 1/2015 | Asim et al. | |
| 2015/0082399 A1 * | 3/2015 | Wu | H04L 9/0897 726/10 |
| 2015/0113275 A1 * | 4/2015 | Kim | H04L 9/0877 713/169 |
| 2015/0295720 A1 * | 10/2015 | Buldas | H04L 9/3239 713/176 |
| 2016/0065370 A1 * | 3/2016 | Le Saint | H04L 9/0861 713/155 |
| 2016/0119146 A1 * | 4/2016 | Anderson | H04L 9/0869 380/30 |
| 2017/0063559 A1 * | 3/2017 | Wallrabenstein | H04L 9/085 |
| 2017/0085380 A1 | 3/2017 | Pandrangi et al. | |
| 2017/0099151 A1 * | 4/2017 | Kim | H04L 9/0643 |
| 2017/0236120 A1 | 8/2017 | Herlihy et al. | |
| 2017/0250801 A1 | 8/2017 | Chen et al. | |
| 2017/0347264 A1 * | 11/2017 | Holland | H04L 9/3242 |
| 2018/0025435 A1 | 1/2018 | Karame et al. | |
| 2018/0075262 A1 * | 3/2018 | Auh | H04L 9/085 |
| 2018/0088814 A1 * | 3/2018 | Namiki | G06F 3/067 |
| 2018/0101560 A1 | 4/2018 | Christidis et al. | |
| 2018/0157558 A1 | 6/2018 | Karame et al. | |
| 2018/0183601 A1 * | 6/2018 | Campagna | G06F 21/602 |
| 2018/0183771 A1 * | 6/2018 | Campagna | H04L 63/0442 |
| 2018/0183774 A1 * | 6/2018 | Campagna | H04L 9/3247 |
| 2018/0212779 A1 * | 7/2018 | Bergmann | H04L 9/0869 |
| 2018/0241548 A1 | 8/2018 | Dolev et al. | |
| 2018/0248845 A1 | 8/2018 | Irwan et al. | |
| 2018/0308091 A1 | 10/2018 | Malkhi et al. | |
| 2018/0336552 A1 | 11/2018 | Bohli et al. | |
| 2018/0337771 A1 | 11/2018 | Baker et al. | |
| 2019/0007218 A1 * | 1/2019 | Kahoul | H04L 63/0838 |
| 2019/0014124 A1 | 1/2019 | Reddy et al. | |
| 2019/0147438 A1 | 5/2019 | Micali et al. | |
| 2019/0245856 A1 | 8/2019 | Irwan et al. | |
| 2019/0386829 A1 | 12/2019 | Karame et al. | |
| 2021/0312078 A1 * | 10/2021 | Jayachandran | H04L 63/123 |
| 2021/0314139 A1 * | 10/2021 | Zhang | H04L 9/0825 |
| 2021/0336771 A1 * | 10/2021 | Mukherjee | H04L 9/085 |
| 2021/0342894 A1 * | 11/2021 | Pestana | H04L 9/3218 |
| 2021/0344493 A1 * | 11/2021 | Diehl | H04L 9/3239 |
| 2021/0365943 A1 * | 11/2021 | Buldas | G06Q 20/405 |
| 2022/0004539 A1 * | 1/2022 | De Caro | G06F 16/2379 |
| 2022/0014502 A1 * | 1/2022 | Gauthier | H04L 9/30 |
| 2022/0027348 A1 * | 1/2022 | Manevich | H04L 9/085 |
| 2022/0038285 A1 * | 2/2022 | Youssef | H04L 9/30 |
| 2022/0085989 A1 * | 3/2022 | Yadlin | H04L 9/50 |
| 2022/0092588 A1 * | 3/2022 | Jain | H04L 9/3247 |
| 2022/0094560 A1 * | 3/2022 | Gaur | H04L 9/3247 |
| 2022/0114584 A1 * | 4/2022 | Conley | G06Q 20/12 |
| 2022/0131698 A1 * | 4/2022 | Badrinarayanan | H04L 9/3271 |
| 2022/0200789 A1 * | 6/2022 | Lalande | H04W 12/50 |
| 2022/0209960 A1 * | 6/2022 | Zuckerman | H04L 9/3239 |

OTHER PUBLICATIONS

Giuliana Veronese et al., "Efficient Byzantine Fault-Tolerance", IEEE Transactions on Computers, Jan. 2013, pp. 1-16.

Ewa Syta, et al., "Keeping Authorities "Honest or Bust" with Decentralized Witness Cosigning", 2016 IEEE Symposium on Security and Privacy, Dec. 2016, pp. 1-20.

Jian Liu, et al., "Scalable Byzantine Consensus via Hardware-assisted Secret Sharing", arXiv:1612.04997v1, Dec. 15, 2016, pp. 1-11.

Giuliana Santos Veronese et al: "Efficient Byzantine Fault Tolerance", IEEE Transactions on Computers, IEEE, USA, vol. 62, No. 1, Jan. 1, 2013 (Jan. 1, 2013), pp. 16-30, XP011475447.

Leslie Lamport: "Password authentication with insecure communication", Communications of the ACM, Association for Computing Machinery, Inc, United States, vol. 24, No. 1a, Nov. 1, 1981 (Nov. 1, 1981), pp. 770-772, XP058263014.

U.S. Appl. No. 15/950,185, filed Apr. 11, 2018.

* cited by examiner

SCALABLE BYZANTINE FAULT-TOLERANT PROTOCOL WITH PARTIAL TEE SUPPORT

CROSS-REFERENCE TO RELATED APPLICATION

This application is a continuation of U.S. patent application Ser. No. 15/950,185, filed on Apr. 11, 2018, which claims priority to U.S. Provisional Patent Application No. 62/561,726, filed on Sep. 22, 2017. The entire disclosures of which are hereby incorporated by reference herein.

FIELD

The invention relates to Scalable Byzantine Fault-Tolerant (BFT) algorithms and also to permissioned blockchains.

BACKGROUND

Byzantine fault-tolerant (BFT) protocols solve the state machine replication problem of a distributed system by reaching consensus on the order of operations requested to the system. In other words, as long as the operations are deterministic, the system state on the majority of the honest nodes are consistent as they execute the series of operations in the same order. Although the correctness and liveness of the BFT protocols have previously been proven, such protocols have not yet seen significant real-world deployment, due to their poor efficiency and scalability. In a system with n servers (nodes), such protocols need to exchange $O(n^2)$ messages to reach consensus on a single operation. Consequently, existing commercial systems, such as those used by Google and Amazon, rely on weaker crash fault-tolerant variants (e.g., Paxos and Raft).

Recent interest in blockchain technology has given fresh impetus for developing and improving BFT protocols. A blockchain is a key enabler for distributed consensus, serving as a public ledger for digital currencies (e.g., Bitcoin) and other applications. Bitcoin's blockchain relies on the well-known proof-of-work (PoW) mechanism to ensure probabilistic consistency guarantees on the order and correctness of transactions. It is a great success to have PoW regulate the transaction order agreement among thousands of nodes, which cannot be achieved by conventional BFT protocols due to the limitation of the communication complexity. However, Bitcoin's PoW has been severely criticized for its considerable waste of energy and meagre transaction throughput (~7 transactions per second).

To remedy these limitations, there are several proposals to make the traditional BFT protocols, which are excellent in terms of transaction throughput with dozens of nodes, more scalable to handle consensus for thousands of participating nodes. MinBFT (described in G. S. Veronese, M. Correia, A. Neves Bessani, L. C. Lung and P. Verissimo, "Efficient byzantine fault-tolerance," in *IEEE Transactions on Computers*, 2013) and CheapBFT, (described in R. Kapitza, S. Johannes Behl, C. Cachin, T. Distler, S. Kuhnle, S. V. Mohammadi, W. Schroder-Preikschat and K. Stengel, "CheapBFT: resource-efficient byzantine fault tolerance," in *Proceedings of the 7th ACM european conference on Computer Systems*, 2012) first propose to use TEE (Trusted Execution Environment) to reduce the total number of peers from 3f+1 to 2f+1, where f is the number of tolerated nodes. However, the communication complexity still remains to be $O(n^2)$, which prevents the network from scaling up to hundreds of nodes. Cosi (described in E. Syta, I. Tamas, D. Visher, D. Isaac Wolinsky, P. Jovanovic, L. Gasser, N. Gailly, I. Khoffi and B. Ford, "Keeping authorities" honest or bust "with decentralized witness cosigning," in *Security and Privacy*, 2016) leverages tree structure and signature aggregation to reduce the communication complexity to $O(n)$, but using public signature on each node is expensive and the system still requires 3f+1 nodes. FastBFT (described in J. Liu, W. Li, G. O. Karame and N. Asokan, *Scalable Byzantine Consensus via Hardware-assisted Secret Sharing*, arXiv preprint arXiv:1612.04997, 2016) combines TEE with an efficient message aggregation technique based on secret-sharing to achieve a more efficient protocol using only 2f+1 nodes.

SUMMARY

In an embodiment, the present invention provides a method for preparing a plurality of distributed nodes connected via a data communication network to perform a protocol to establish a consensus on an order of received requests. The plurality of distributed nodes includes a plurality of active nodes, the plurality of active nodes including a primary node, each of the plurality of distributed nodes including a processor and computer readable media. The method includes preparing a set of random numbers, wherein each of the random numbers is a share of an initial secret. Each share of the initial secret corresponds to one of the plurality of active nodes. The method further includes encrypting, in order to generate encrypted shares of the initial secret, each respective share of the initial secret, binding the initial secret to a last counter value to provide a commitment and a signature for the last counter value, and generating shares of a second and of a plurality of subsequent additional secrets by iteratively applying a hash function to shares of each preceding secret. The method additionally includes binding the second secret to a second-to-last counter value and each subsequent secret to a preceding counter value to provide a commitment and a signature for the second-to-last counter value and for each preceding counter value; and transmitting, to each of the plurality of active nodes, the commitments and signatures for each of the counter values along with the encrypted shares of the initial secret and a set of hash values produced by applying the hash function to the shares of the last secret. Each of the plurality of active nodes is configured to decrypt a corresponding encrypted share of the initial secret and to generate shares of the remaining secrets by applying the hash function to the decrypted share of the initial secret.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following.

DETAILED DESCRIPTION

Figure 1:
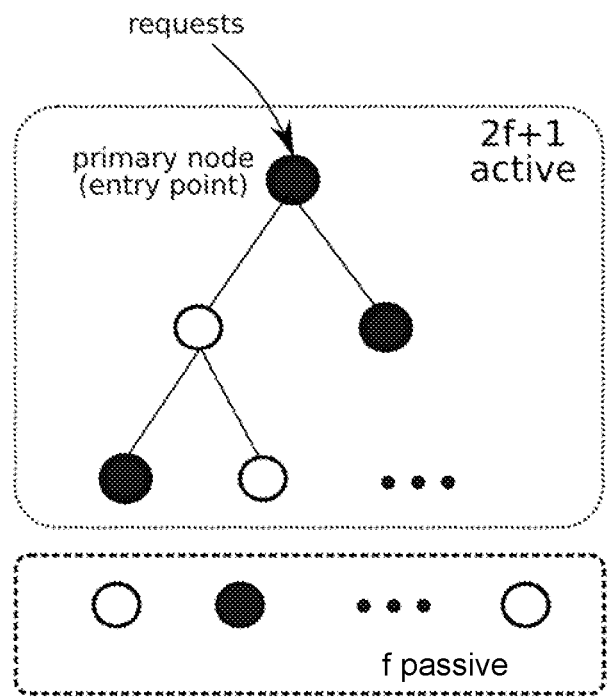
FIG. 1 depicts a network composed of a number of nodes according to an embodiment of the invention.

BFT protocols that reduce the total number of nodes necessary to establish consensus, e.g. MinBFT, CheapBFT, and FastBFT, require that all such nodes be equipped with secure hardware. Requiring all participating nodes to be equipped with secure hardware is especially challenging for a large network with hundreds of nodes. Furthermore, such BFT protocols require considerable processing resources of participating nodes, e.g. processing resources required for performing encryption and decryption of a large number of messages. For example, for a network with n nodes and m committed secrets in a batch, the pre-processing phase in FastBFT involves n*m symmetric encryption operations on secret shares.

Embodiments of the present invention provide scalable BFT protocols that require only a selection of nodes to have secure hardware. Specifically, scalable BFT protocols are described herein that require only f+1 nodes to be equipped with secure hardware in order to establish consensus despite the Byzantine failure off nodes. Therefore, use of the scalable BFT protocols described herein can broaden the scope of potential networks in which BFT protocols can be implemented. Furthermore, by relaxing the requirements for secure hardware relative to prior art BFT protocols, the scalable BFT protocols described herein can reduce the costs of providing a network capable of executing BFT protocols or alternatively, the costs of modifying an existing network in order to render it capable of executing BFT protocols.

Embodiments of the invention provide scalable BFT protocols that improve the computational efficiency of nodes that participate in carrying out a BFT consensus protocol and thereby improve the overall computational efficiency of a distributed system for maintaining consensus. Scalable BFT protocols are described herein in which the number of encryptions and decryptions performed by various nodes can be significantly reduced relative to the number required to be performed by prior art BFT protocols. Specifically, scalable BFT protocols are described herein that include a novel pre-processing phase during which a primary node generates n shares of an initial secret bound to a last of m counters in a batch, encrypts only the n shares of the initial secret, and then generates shares of secrets bound to each of the preceding m−1 counters by applying a hash function to the shares of the initial secret. During such pre-processing phase, only n encryptions are needed (instead m×n encryptions as required by prior art BFT protocols). Furthermore, each of the n nodes that receive a share of the secret need only perform a single decryption followed by m−1 hash computations in order to derive shares used to vote for m subsequent messages (as compared to performing m decryptions as required by prior art BFT protocols). As a result of the improved computational efficiency, scalable BFT protocols according to embodiments of the invention enable systems for maintaining consensus to handle greater numbers of transactions in a given period of time while requiring fewer computational resources and utilizing less energy. As a result, the scalable BFT protocols according to embodiments of the invention improve the performance of systems for maintaining consensus among a plurality of distributed nodes, e.g. blockchain systems.

Embodiments of the present invention provide BFT protocols in which a hash chain is used to generate shares of a secret generated according to a secret-sharing, or secret-splitting, scheme. The secret is bound and committed to a counter value in the trusted execution environment (TEE) of a primary node during the preprocessing phase. The shares of the secret are then distributed to the active nodes that participate in carrying out the BFT consensus protocol to improve the efficiency for a batch of committed counter values. Embodiments of the invention also leverage collective remote attestation on a trusted execution environments (TEE) for primary election to avoid using a faulty primary and therefore avoid unnecessary view changes to faulty nodes.

Embodiments of the present invention provide systems, methods, and non-transitory computer readable media for BFT replication of data at a plurality of nodes, e.g. servers. Assuming f nodes are byzantine faulty, BFT protocols according to embodiments of the present invention require at least n=3f+1 nodes in the network, wherein 2f+1 of the nodes are active and f of the nodes are passive. The active nodes are connected in a tree structure or a star structure (a tree structure with height=1 is a star structure). The active nodes respond to messages and update the state, while passive nodes only listen to messages and update a local state. The node at the root position of the tree (or star) is referred to as the primary node and serves as an entry point for client requests. BFT protocols according to embodiments of the present invention require f+1 nodes in the network be equipped with secure hardware and that the endorsement key of the secure hardware of each such node can be verified by all of the other f+1 nodes. In this manner, if the primary node is faulty, e.g. due to a crash, and a view change is required, there are f remaining nodes having secure hardware such that at least one correct node can replace the faulty primary and the system can tolerate f nodes that are byzantine faulty.

Embodiments of the present invention provide BFT protocols that include both offline operations and online operations. The offline operations are performed in an initialization stage and a preprocessing stage. The online operations are performed in the phases of normal-case and view-change. The online operations are triggered by requests from the clients who will then wait for the completion of the phases to obtain the response, while the offline operations are performed in the background when they are required.

According to an embodiment, the present invention provides a method for establishing consensus between a plurality of distributed nodes connected via a data communication network, the plurality of distributed nodes including a primary node and a plurality of active nodes, each of the plurality of distributed nodes including a processor and computer readable media. The method includes preparing a set of random numbers, wherein each of the random numbers is a share of an initial secret, wherein each share of the initial secret corresponds to one of the plurality of nodes; encrypting each respective share of the initial secret with a shared key corresponding to respective one of the plurality of nodes to which the respective share corresponds to generate encrypted shares of the initial secret; applying a bitwise xor function to the set of random numbers to provide the initial secret; and binding the initial secret to a last counter value to provide a commitment and a signature for the last counter. The method further includes generating shares of a second and of a plurality of subsequent additional secrets by iteratively applying a hash function to shares of each preceding secret; binding the second secret to a secondto-last counter and each subsequent secret to a preceding counter to provide a commitment and a signature for the second-to-last counter and for each preceding counter; and broadcasting, to each of the plurality of active nodes, the commitments and signatures for each of the counters along with the encrypted shares of the initial secret and a set of hash values produced by applying the hash function to the shares of the last secret. Each of the plurality of active nodes is configured to decrypt a corresponding encrypted share of the initial secret and to generate shares of the remaining secrets by applying the hash function to the decrypted share of the initial secret.

According to an embodiment, the present invention provides a computer readable medium having stored thereon instructions for carrying out such a method for establishing consensus between a plurality of distributed nodes connected via a data communication network. Furthermore, according to an embodiment, the present invention provides a system including a plurality of distributed nodes connected via a data communication network and configured to establish a consensus.

According to embodiments of the invention, the primary node can organize the plurality of active nodes into a tree structure. The tree structure can be a star structure.

According to embodiments of the invention, the primary node can receive, from a plurality of active nodes, an attestation request including a challenge. The primary node can compute a signature over the challenge in the attestation request and a hash of an application loaded in a trusted execution environment (TEE) of the primary node as a remote attestation proof of integrity of the TEE application.

According to embodiments of the invention, the primary node can receive, from the plurality of active nodes, a plurality of shares of the last secret and reconstruct the last secret based on the plurality of received shares of the last secret.

According to embodiments of the invention, preparing a set of random numbers, wherein each of the random numbers is a share of an initial secret, wherein each share of the initial secret corresponds to one of the plurality of nodes can include preparing n random numbers $r_1, \ldots, r_n$ for each active node $P_i$, where the ith share of the initial secret $h_i^0 = r_i$. Encrypting each respective share of the initial secret with a shared key corresponding to a respective one of the plurality of nodes to which the respective share corresponds to generate encrypted shares of the initial secret can include encrypting, using a shared key $k_i$ corresponding to each active node $P_i$, the random numbers $r_1, \ldots, r_n$ to provide the encrypted shares of the initial secret $C_i = Enc(k_i, r_i)$. Applying a bitwise xor function to the set of random numbers to provide the initial secret can include applying a bit-wise xor to all $h^0$ to provide the initial secret $s^0 = h_1^0 \oplus h_2^0 \ldots h_n^0$. Binding the initial secret to a last counter value to provide a commitment and a signature for the last counter can include binding the initial secret $s^0$ with the last counter $c^m$ to provide the commitment $cmt^m = H(s^0, c^m)$ and the signature $S^m = Sign(cmt^m, c^m)$ for the last counter, wherein $H()$ is a cryptographic hash function. Generating shares of a second and of a plurality of subsequent additional secrets by iteratively applying a hash function to shares of each preceding secret can include generating shares and the plurality of subsequent secrets $h_i^j = H(h_i^{j-1})$ for $j=1, \ldots, m-1$. Binding the second secret to a second-to-last counter and each subsequent secret to a preceding counter to provide a commitment and a signature for the second-to-last counter and for each preceding counter can include binding the secrets $s^j$ with the counters $c^{m-j}$ to provide the commitments $cmt^{m-j} = H(s^j, c^{m-j})$ and the signatures $S^{m-j} = Sign(cmt^{m-j}, c^{m-j})$ for $j=m-1$.

According to embodiments of the invention, the primary node can receive a request from a client and transmit a reply to the client including the reconstructed last secret. The primary node can further broadcasting the reply to a plurality of passive nodes.

FIG. 1 depicts a network including of a number of nodes in which a subset thereof are active. Specifically, in FIG. 1, $2f+1$ nodes are active and f nodes are passive. In the figure, solid circles represent nodes equipped with secure hardware. Each node can be, e.g., a server. The primary node/server, or entry point, is secure hardware supported. In FIG. 1, each node, or server, is a physical machine including compute resources, storage resources, and network resources. The compute resources at each node can include one or more processors each having one or more processor cores. The storage resources at each node can include computer readable memory, e.g., random-access-memory (RAM) and/or cache memory. The network resources include a physical network interface controller (NIC). Each node additionally includes a bus that couples various system components, e.g. the processors and the computer readable memory, together. The network interface controller of each node enables it to interface with other nodes. The secure hardware can be, e.g., a system on a chip (SoC) including secure compute resources and protected memory resources. The secure compute resources can include one or more processors each having one or more processor cores, e.g. a secure cryptoprocessor. Access to the protected memory resources of the secure hardware is controllable only by the secure hardware. The secure hardware is tamper-resistant. In this manner, security-critical logic can be isolated and protected from all other hardware and software running on an entity or server.

Figure 2:
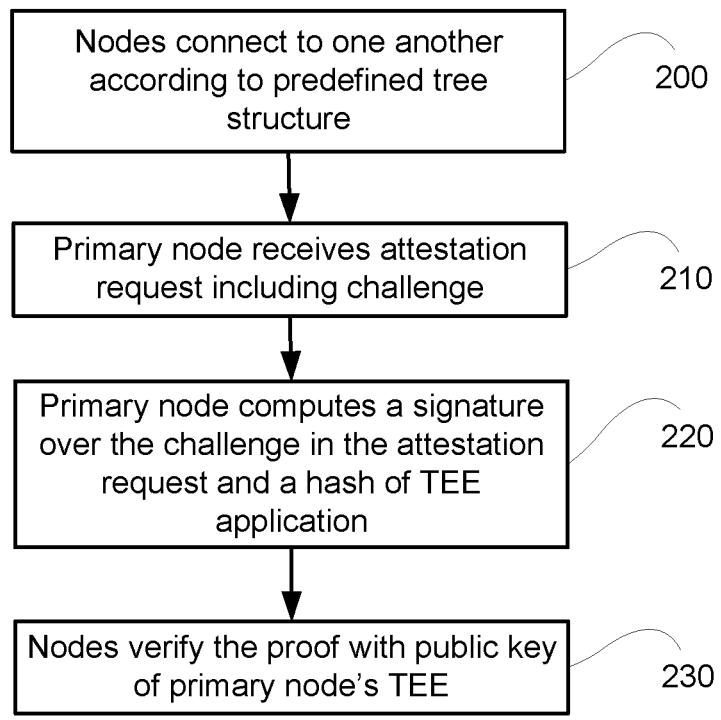
FIG. 2 is a flow diagram illustrating an initialization procedure according to an embodiment of the present invention.

FIG. 2 is a flow diagram illustrating an initialization procedure of a process for establishing consensus between a plurality of distributed nodes according to an embodiment of the present invention. The initialization procedure includes organizing the nodes into a tree structure (which, in the case where the tree structure has height=1, is a star structure). The initialization procedure also includes proving the integrity of a trusted execution environment (TEE) of the primary node at the root of the tree structure.

At 200, the nodes connect with each other according to a tree structure. Various algorithms can be utilized for organizing the nodes into the tree structure. For example, a randomization function can be utilized that takes in all the node ids and their current indexes and outputs their new indexes in the tree. The only requirement of the tree-structure is that the root of the tree, i.e. the primary node, must have TEE support.

At 210, the primary node receives a plurality of attestation requests including a challenge from the other active nodes. At 220, the primary node computes a signature over the challenge in the attestation request and a hash of a consensus-establishing application loaded in the TEE and then broadcasts the signature over the challenge and the hash as a remote attestation proof of the integrity of its TEE application. Thereafter, at 230, all nodes verify the proof with the endorsement public key of the primary's secure hardware and reset the local copy of a counter of the primary node. The challenge used to compute the remote attestation proof should be a random number that is unpredictable and verifiable by all nodes. It can be third-party random source that is trusted by all nodes such as the current block hash of Bitcoin. Alternatively, the random number can be generated collectively by all nodes, e.g., through a secret-shared random number, a Bloom filter, or an accumulator that has integrated all random inputs from the nodes to the challenge.

Figure 3:
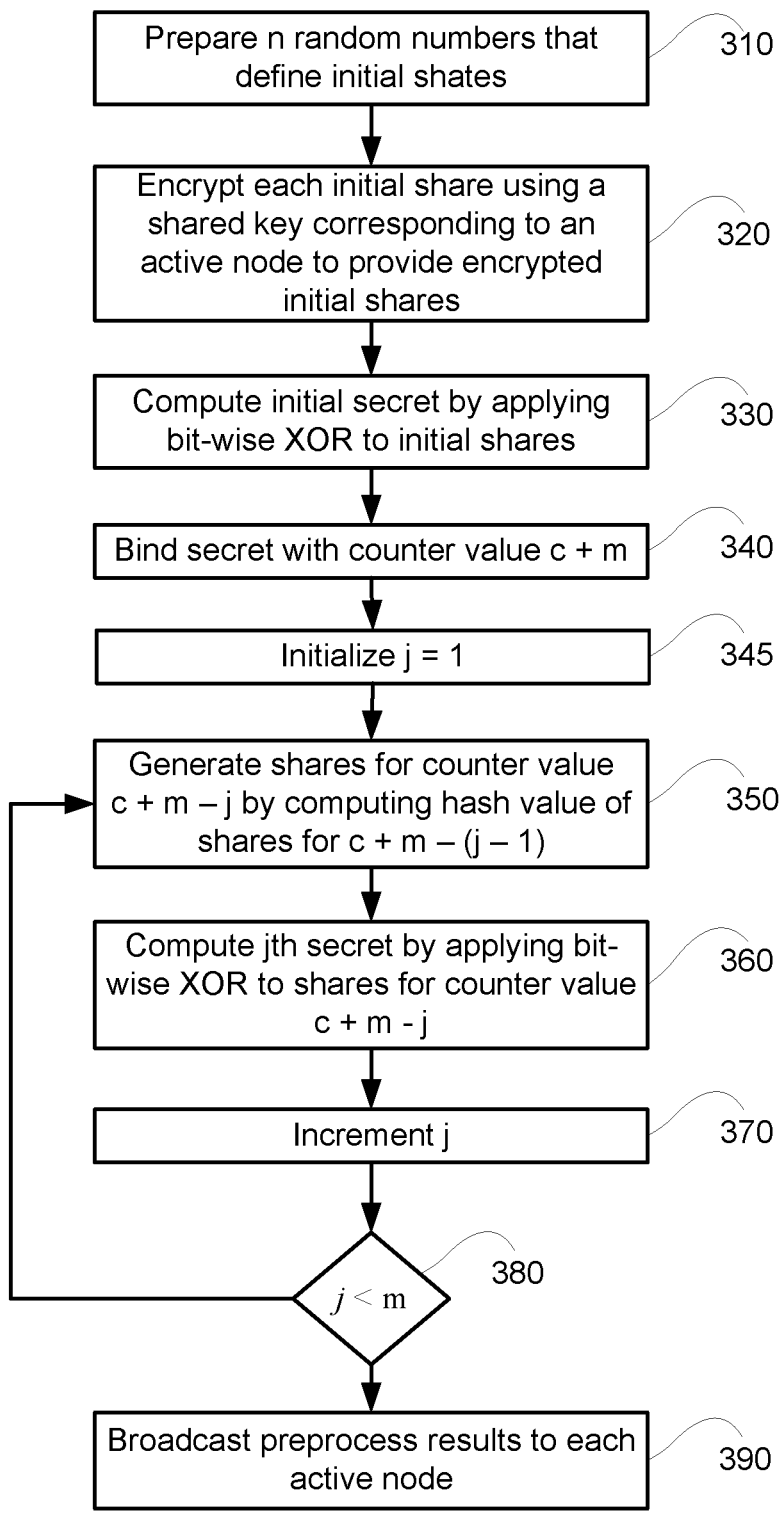
FIG. 3 is a flow diagram illustrating a preprocessing procedure according to an embodiment of the invention.

FIG. 3 is a flow diagram illustrating a preprocessing procedure of a process for establishing consensus between a plurality of distributed nodes according to an embodiment of the invention. During the preprocessing procedure, the TEE application of the primary node performs a computation to bind and commit m secrets to m counter values, wherein the m counter values will subsequently be assigned to m incoming request messages in the normal-case phase of the online operations. During the normal-case phase, the primary node receives the incoming request messages from one or more clients and assigns the counter values to the incoming messages in order to indicate the order that all nodes should agree on while handling the messages. Therefore, by securely generating a secret for each counter value, binding and committing each secret to a corresponding counter value, and distributing shares of each secret during the preprocessing stage, each node can reveal, during the normal-case phase, the share of a secret (which is bound and committed to a counter value) as a vote for the order in which the requests are to be processed. In that manner, the revelation of secret shares by each of the active nodes enables the nodes to reach consensus efficiently, as the reconstruction of the secret from shares only involves polynomial computation or light-weight cryptography. The preprocessing procedure of FIG. 3 can be invoked periodically or at irregular intervals or can be triggered by the occurrence of certain conditions. At each invocation of the preprocessing procedure, the primary node commits m secrets to m counter values that can be assigned to incoming request messages in the future.

At 310, the TEE application of the primary node randomly generates n=2f+1 random numbers $r_1, r_2, \ldots, r_n$ that serve as n initial shares $h_i^0$ (i=1, ..., n) for nactive nodes $P_1, \ldots, P_n$, one of which is the primary node. Note that there are N=3f+1 total nodes in the system. At 320, the TEE application of the primary node encrypts each of the initial shares $h^0$ (i=1, ..., n) with a corresponding key $k_i$ shared with a corresponding active node $P_i$ to provide $C_i=Enc(k_i, h_i^0)$ for i=1, ..., n. At 330, the TEE application of the primary node applies bit-wise xor to all shares $h_i^0$ to provide initial secret $s^0=h_1^0 \oplus h_2^0 \ldots \oplus h_n^0$. As a result, only when all active nodes reveal their shares $h_i^0$ can they reconstruct the secret $s^0$. At 340, the TEE application of the primary node binds secret $s^0$ with counter value c+m, where c is the offset of the counter value, and m is the batch size for the preprocessing operation. The binding is achieved by generating the commitment $cmt^m$ over the secret $s^0$ and the counter value c+m along with a digital signature $S^m$. A possible commitment scheme utilizes a cryptographic hash function: $cmt^m=H(s^0, c+m)$ and signature is computed as $S^m=Sign(sk_1, cmt^0, c+m)$, where $sk_1$ is the private key of the primary node $P_1$ secured by its TEE application. The signed commitment $\langle cmt^m, S^m \rangle$ allows all nodes to verify the revealed secret $s^0$, and be able to conclude whether enough votes have been cast to reach consensus on the message which is assigned with counter value c+m.

At 345, an index j is initialized as j=1. At 350, the TEE application of the primary node generates the shares $h_i^j=H(h_i^{j-1})$ for the next counter value c+m−j. The shares for counter c+m−j are computed as the hash value of the previous shares: $h_i^j=H(h_i^{j-1})$ for i=1, ..., n. At 360, the TEE application of the primary node applies bit-wise xor to all shares $h_i^j$ to provide secret $s^j=h_1^j \oplus h_2^j \ldots \oplus h_n^j$. At 370, the TEE application of the primary node binds secret $s^j$ with counter value c+m−j. The binding is achieved by generating the commitment $cmt^{m-j}$ over the secret $s^j$ and the counter value c+m−j along with a digital signature $S^{m-j}$. If the commitment scheme utilizes the cryptographic hash function described above, $cmt^{m-j}=H(s^j, c+m-j)$ and signature is computed as $S^{m-j}=Sign(sk_1, cmt^{m-j}, c+m-j)$, where $sk_1$ is the private key of the primary node $P_1$ secured by its TEE application. The signed commitment $\langle cmt^{m-j}, S^{m-j} \rangle$ allows all nodes to verify the revealed secret $s^j$, and be able to conclude whether enough votes have been casted to reach consensus on the message which is assigned with counter value c+m−j. At 370, the index j is incremented, and at 380, the process compares j with the value m. If j<m, the process returns to 350. If j≥m, the process proceeds to 390.

At 390, the TEE application of the primary node generates the shares $h_i^m=H(h_i^{m-1})$ and then reveals the preprocess result $\langle C_i, \{h_1^m, \ldots, h_n^m\}, \{\langle cmt^1, S^1 \rangle, \ldots, \langle cmt^m, S^m \rangle\} \rangle$ to the primary node, which then broadcasts it to each active node $P_i$. Upon receipt of the preprocess result, each active node $P_i$ can first decrypt $C_i$ using the corresponding key $k_i$ shared with the primary node to obtain the initial share $h_0^i$. Each active node $P_i$ can then derive the remaining shares $(h_i^1, \ldots, h_i^{m-1})$ by iteratively applying the cryptographic hash function H. Meanwhile, the committed counter values $cmt^j$ are accepted once signature $S^j$ is verified.

In the normal-case operations, after node $P_i$ successfully verifies a PREPARE message which assigns (by the primary node) counter value c+1 to a request message M, $P_i$ acknowledges the assigned order of the request by revealing his corresponding share $h_i^{m-1}$; his parent node $P_k$ in the tree structure verifies the integrity with $h_i^m$ and aggregates the votes by computing $h_i^{m-1} \oplus h_k^{m-1}$. When all nodes reveal their shares, secret $\hat{s}^{m-1}$ is reconstructed on the primary node (the root of the tree) with all the aggregated shares $\hat{s}^{m-1}=h^{m-1} \oplus \ldots \oplus h_n^{m-1}$. The primary node then reveals the reconstructed secret $\hat{s}^{m-1}$ to all the other nodes. Each active node can then check whether the revealed secret $\hat{s}^{m-1}$ is indeed reconstructed correctly by verifying if $cmt^1=H(\hat{s}^{m-1}, c+1)$ Note that $\{h_1^m, \ldots, h_n^m\}$ is broadcast to all active nodes, therefore any node is able to verify (through one or more hash functions) the integrity of a revealed share $h_i^j$. If the integrity check of a share $h_i^j$ revealed by a child node fails, the parent node can broadcast his suspicion with the corresponding evidence and thus the network can replace a misbehaving child node with a passive node in the pool of passive nodes. If multiple nodes are corrupted and the reconstructed secret is wrong, the primary can ask the active nodes to resend the shares directly to him without aggregation, thus enabling the primary to identify and replace the misbehaving nodes. If the secret is constructed wrongly or is not revealed after certain timeout (i.e., the network fails to reach consensus) and the primary takes no further actions, then the active nodes suspect the primary is malicious and thus trigger a view-change process to replace the primary.

The protocol loosens the requirement of the TEE support by requiring more nodes (2f+1 instead of f+1) to be actively involved in the consensus process. But the protocol does not require the secondary nodes to perform any computation in the TEE application thus only the minimum number of nodes are required to have TEE support.

During the preprocessing procedure of FIG. 3, the shares for a batch of counter values are derived through a hash chain based on the initial shares. As a result, no matter how big the batch is (i.e., m), instead of encrypting all n×m shares, the TEE application of the primary node only needs to encrypt n initial shares before sending it to the nodes. Similarly, each node $P_i$ does not need to decrypt the shares for each of the m counter values. Instead, $P_i$ only decrypts his initial share $h_i^0$, and the rest of the shares can be computed from the initial share through a light-weight hash function. Note that for counter value c+j for j=1, ..., m, the corresponding shares are $h_1^{m-k}$, ..., $h_n^{m-j}$. The generating of the shares and secrets and the binding of the secrets to the m counter values of the preprocessing procedure is illustrated by FIG. 4, which is a block diagram illustrating the preprocessing procedure of FIG. 3.

Figure 4:
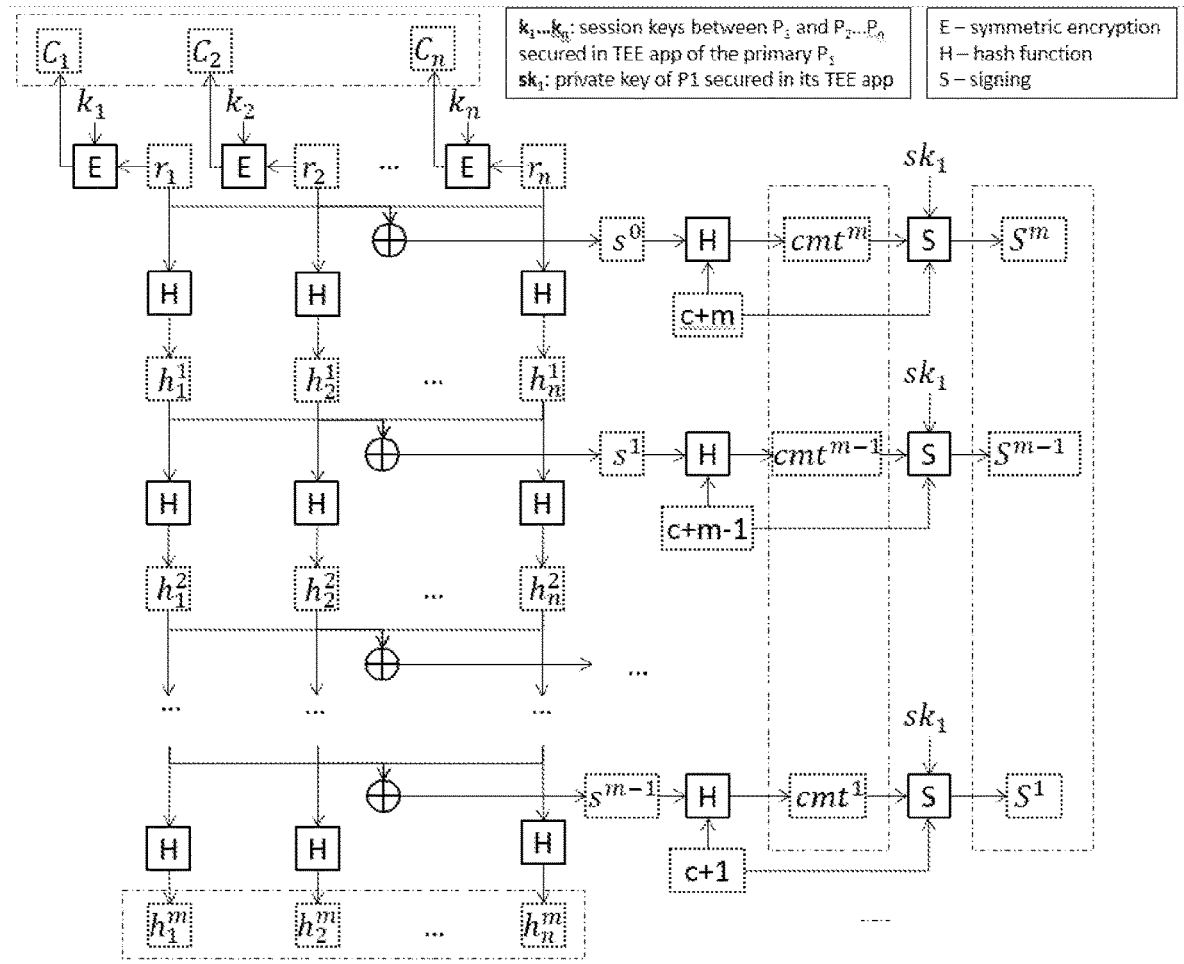
FIG. 4 is a block diagram illustrating the preprocessing procedure of FIG. 3.
Figure 5:
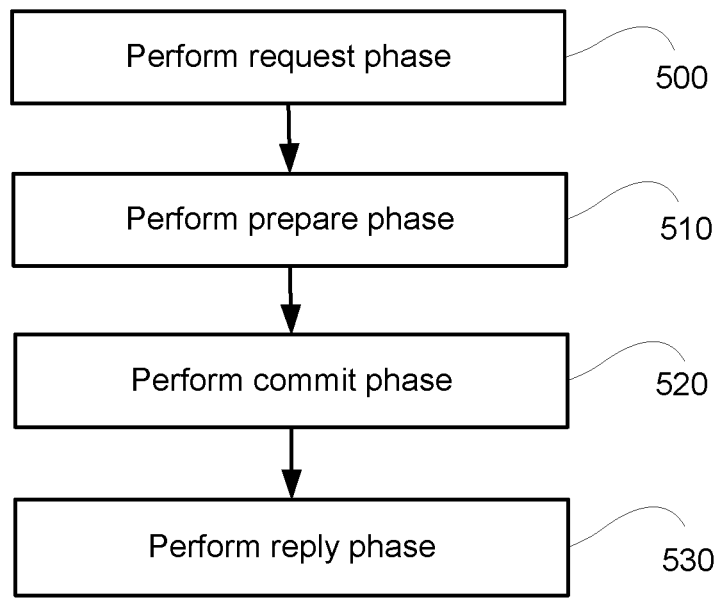
FIG. 5 is a flow diagram illustrating a normal-case operation procedure according to an embodiment of the invention.

Following the preprocessing procedure illustrated in FIGS. 3 and 4, a normal-case phase of a process for establishing consensus between a plurality of distributed nodes can take place. FIG. 5 is a flow diagram illustrating a process for establishing consensus between a plurality of nodes according to an embodiment of the present invention. At 500, a request phase is performed in which a client transmits a request message M to the primary node. The request message is signed with the client's private key.

At 510, a prepare phase is performed. In the prepare phase, the primary node verifies the signature of the request message and multicasts a PREPARE message (PREPARE, M, v, $\langle H(M), c+j \rangle \sigma_p$) by to its children nodes, and the children nodes forward the prepare message along the tree. Note that H(M) is the message digest of the request message M, v is the view number that increases whenever a view-change happens (after a view-change, the primary node is replaced and the view number increases by 1), and $\sigma_p$ is the signature of the PREPARE message by the TEE application of the primary node of the current view. The primary node obtains $\langle H(M), c+j \rangle$ by submitting the hash of the request H(M) to its TEE application. c+j is the current counter value returned by the advanced monotonic counter inside the primary's TEE application. The result is also signed by the primary's TEE as signature $\sigma_p$. Each peer node $P_i$ verifies the signature $\sigma_p$ of the PREPARE message and compares the received counter value c+j with the last recorded primary counter value $c_p$ if c+j=$c_p$+1. If the received counter is too advanced as it leaves 'holes' in counter sequence, the PREPARE message will be pended until those with succeeding counters are processed. This is to guarantee that the messages M can be executed as soon as they are accepted, for the same reason as in work MinBFT. Once the PREPARE message is validated, the leaf nodes reveal their shares to the parent nodes with reveal responses $\langle REVEAL, c+j, h_i^{m-j}, \phi \rangle$, while non-leaf nodes await responses from their children and then verify their children's responses with the last recorded hash $h_k$ if $h_k = H(h_k^{m-j})$ for child node $P_k$. Then the shares are aggregated on $P_i$ as $s_i^{m-j} = \oplus_k h_k^{m-j} \oplus_k \hat{s}_k^{m-j}$ before sending the response $\langle REVEAL, c+j, h_i^{m-j}, \hat{s}_i^{m-j} \rangle$ to its parent. If the check on the revealed share of a child node fails, a node can broadcast a faulty suspicion on his child node, which can trigger further process to replace the faulty node with a passive node.

At 520 a commit phase is performed. During the commit phase, after receiving the aggregated shares, the primary node reconstructs the secret $s^{m-k}$ and verifies with the commitment $cmt^j$ generated by the primary's TEE during the preprocessing stage. If valid, the primary node executes the request and multicasts a COMMIT message with the execution result res: $\langle COMMIT, s^{m-j}, res, \langle H(res), c+j+1 \rangle \sigma_p \rangle$. Each peer node verifies the revealed secret $s^{m-j}$ with the commitment received during the preprocessing phase $\langle cmt^j, S^j \rangle$. If valid, the peers execute the request M and compare the result res. Then they reveal the shares for counter c+j+1 similarly to the Prepare phase.

At 530, a reply phase is performed. During the reply phase (and similar to the Commit phase), the primary node reconstructs the secret for counter c+j+1 and multicasts a reply message to the other nodes, e.g. the passive nodes: $\langle REPLY, c+j+1, s^{m-j-1} \rangle$. Additional details of the normal-case operation of the process for establishing consensus between a plurality of distributed nodes can be found in PCT/EP 2016/078883, which is incorporated by reference herein.

According to embodiments of the invention, a view-change procedure similar to the protocol MinBFT can be performed under certain circumstances. For example, when peers receive a request but no REPLY message after a certain timeout, they request a view-change to replace the primary node along with a fresh challenge for the TEE remote attestation of the primary candidate, which is known by all nodes through a pre-defined algorithm.

All nodes send REQ-VIEW-CHANGE requests providing the current counter and the last opened secret along with a history of executed operations in the last view to the next primary candidate. The primary candidate determines the latest counter and the history through the latest opened secret. A NEW-VIEW along with the history of the last view is then broadcast by the primary candidate to all nodes to execute the missing operations and switch to the new view. Meanwhile, the new view also includes the remote attestation proof of the new primary node, as well as the structure of the new tree. Once each node verifies the NEW-VIEW request, they broadcasts VIEW-CHANGE message to acknowledge changing to this new view. Once a node receives at least f consistent VIEW-CHANGE message from other nodes, they migrate to the new view by executing the missing operations and reconstructing the new tree. Then the new primary proceeds with the pre-process stage to generate committed counters for the new view used for online operations to handle incoming requests.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for preparing a plurality of distributed nodes connected via a data communication network to perform a protocol to establish a consensus on an order of received requests, the plurality of distributed nodes including a plurality of active nodes, the plurality of active nodes including a primary node, each of the plurality of distributed nodes including a processor and computer readable media, the method comprising:

preparing a set of random numbers, wherein each of the random numbers is a share of an initial secret, wherein each share of the initial secret corresponds to one of the plurality of active nodes;

encrypting, in order to generate encrypted shares of the initial secret, each respective share of the initial secret;

binding the initial secret to a last counter value to provide a commitment and a signature for the last counter value;

generating shares of a second and of a plurality of subsequent additional secrets by iteratively applying a hash function to shares of each preceding secret;

binding the second secret to a second-to-last counter value and each subsequent secret to a preceding counter value to provide a commitment and a signature for the second-to-last counter value and for each preceding counter value; and transmitting, to each of the plurality of active nodes, the commitments and signatures for each of the counter values along with the encrypted shares of the initial secret and a set of hash values produced by applying the hash function to the shares of the last secret, wherein each of the plurality of active nodes is configured to decrypt a corresponding encrypted share of the initial secret and to generate shares of the remaining secrets by applying the hash function to the decrypted share of the initial secret.

2. The method according to claim 1, further comprising receiving, by the primary node from others of the plurality of active nodes, a plurality of shares of the last secret; and reconstructing, by the primary node, the last secret based on the plurality of received shares of the last secret.

3. The method according to claim 2, further comprising receiving, by the primary node, a request from a client, wherein the client, after a certain timeout period, transmits a view-change request to replace the primary node in response to not receiving a reply from the primary node before the end of the timeout period.

4. The method according to claim 3, wherein the view-change request includes a current counter value and a last opened secret along with a history of executed operations in the last view.

5. The method according to claim 4, wherein a new primary node candidate broadcasts a new-view message to all nodes.

6. The method according to claim 1, wherein preparing a set of random numbers, wherein each of the random numbers is a share of an initial secret, wherein each share of the initial secret corresponds to one of the plurality of active nodes comprises preparing n random numbers $r_1, \ldots, r_n$ for each active node $P_i$, where the ith share of the initial secret $h_i^0 = r_i$.

7. The method according to claim 6, wherein the encrypting, in order to generate encrypted shares of the initial secret, each respective share of the initial secret is performed with a shared key corresponding to a respective one of the plurality of active nodes to which the respective share corresponds.

8. The method according to claim 7, wherein the encrypting each respective share of the initial secret comprises encrypting, using a shared key $k_i$ corresponding to each active node $P_i$, the random numbers $r_1, \ldots, r_n$ to provide the encrypted shares of the initial secret $C_i = Enc(k_i, r_i)$.

9. The method according to claim 8, further comprising applying a bitwise xor function to the set of random numbers to provide the initial secret.

10. The method according to claim 9, wherein the applying the bitwise xor function to the set of random numbers comprises applying a bit-wise xor to all $h_i^0$ to provide the initial secret $s^0 = h_1^0 \oplus h_2^0 \ldots \oplus h_n^0$.

11. The method according to claim 10, wherein binding the initial secret to a last counter value to provide a commitment and a signature for the last counter value comprises binding the initial secret $s^0$ with the last counter value $c^m$ to provide the commitment $cmt^m = H(s^0, c^m)$ and the signature $S^m = Sign(cmt^m, c^m)$ for the last counter value, wherein $H()$ is a cryptographic hash function.

12. The method according to claim 11, wherein generating shares of a second and of a plurality of subsequent additional secrets by iteratively applying a hash function to shares of each preceding secret comprises generating shares and the plurality of subsequent secrets $h_i^j = H(h_i^{j-1})$ for $j=1, \ldots, m-1$.

13. The method according to claim 12, wherein binding the second secret to a second-to-last counter value and each subsequent secret to a preceding counter value to provide a commitment and a signature for the second-to-last counter value and for each preceding counter value comprises binding the secrets $s^j$ with the counter values $c^{m-j}$ to provide the commitments $cmt^{m-j} = H(s^j, c^{m-j})$ and the signatures $S^{m-j} = Sign(cmt^{m-j}, c^{m-j})$ for $j = m-1$.

14. A tangible, non-transitory computer readable medium comprising instructions for carrying out a method for preparing a plurality of distributed nodes connected via a data communication network to perform a protocol to establish a consensus on an order of received requests, the plurality of distributed nodes including a plurality of active nodes, the plurality of active nodes including a primary node, each of the plurality of distributed nodes including a processor and computer readable media, the method comprising:

preparing a set of random numbers, wherein each of the random numbers is a share of an initial secret, wherein each share of the initial secret corresponds to one of the plurality of active nodes;

encrypting, in order to generate encrypted shares of the initial secret, each respective share of the initial secret;

binding the initial secret to a last counter value to provide a commitment and a signature for the last counter value;

generating shares of a second and of a plurality of subsequent additional secrets by iteratively applying a hash function to shares of each preceding secret;

binding the second secret to a second-to-last counter value and each subsequent secret to a preceding counter value to provide a commitment and a signature for the second-to-last counter value and for each preceding counter value; and transmitting, to each of the plurality of active nodes, the commitments and signatures for each of the counter values along with the encrypted shares of the initial secret and a set of hash values produced by applying the hash function to the shares of the last secret, wherein each of the plurality of active nodes is configured to decrypt a corresponding encrypted share of the initial secret and to generate shares of the remaining secrets by applying the hash function to the decrypted share of the initial secret.

15. A method for establishing consensus, by a plurality of distributed nodes connected via a data communication network, on an order of received requests, the plurality of distributed nodes including a plurality of active nodes, the plurality of active nodes including a primary node, each of the plurality of distributed nodes including a processor and computer readable media, the method comprising:

performing a preprocessing protocol, the preprocessing protocol comprising:
- preparing a set of random numbers, wherein each of the random numbers is a share of an initial secret, wherein each share of the initial secret corresponds to one of the plurality of active nodes;
- encrypting, in order to generate encrypted shares of the initial secret, each respective share of the initial secret;
- binding the initial secret to a last counter value to provide a commitment and a signature for the last counter value;
- generating shares of a second and of a plurality of subsequent additional secrets by iteratively applying a hash function to shares of each preceding secret;
- binding the second secret to a second-to-last counter value and each subsequent secret to a preceding counter value to provide a commitment and a signature for the second-to-last counter value and for each preceding counter value; and
- transmitting, to each of the plurality of active nodes, the commitments and signatures for each of the counter values along with the encrypted shares of the initial secret and a set of hash values produced by applying the hash function to the shares of the last secret, wherein each of the plurality of active nodes is configured to decrypt a corresponding encrypted share of the initial secret and to generate shares of the remaining secrets by applying the hash function to the decrypted share of the initial secret;

assigning, by the primary node during online operations, a counter value to each of a plurality of received requests; and verifying, by the primary node, that a consensus on the order of the plurality of received requests has been established, wherein the verifying is based on the binding of the secrets to the counter values and is further based on aggregated secret shares received by the primary node from others of the plurality of active nodes.

* * * * *